Patented July 19, 1938

2,123,939

UNITED STATES PATENT OFFICE 2,123,939

METHOD OF APPLYING LUMINESCENT COLORS ON BODIES CONSISTING OF GLASS OR OTHER MATERIAL

Edmund Germer, Berlin, Germany

No Drawing. Application April 11, 1936, Serial No. 74,120. In Germany April 11, 1935

4 Claims. (Cl. 91—70)

This invention relates to the well known method of applying luminescent colors on bodies consisting of glass or other material, e. g. discharge tubes, Braun tubes or incandescent lamps, according which the body to be covered with is heated so strongly, that the surface of this body is softened and by this the luminescent color penetrates in the surface of the body; the luminescent color to be applied on is used together with a binder, e. g. glycerine.

These luminescent colors may be, for example, zinc sulphide, calcium tungstate, sidot blende, or Willemite ($Zn_2SiO_4$), as well as other well known luminous materials.

It has happened however, that the binding of the luminescent color which is attained by this method is not sufficient in many cases and that the luminescent color falls off later more and more rapidly. In order to do away with this disadvantage, one has proposed already to cover at first the body with a coating consisting of a low melting glass; the luminescent color shall penetrate during the heating process of the body, more deeply.

This invention is based on the discovery, that a much better mixture of the luminescent color with the surface of the body so attained can be produced, if the heating process of the body coated with the luminescent color is performed in a gaseous atmosphere under pressure.

For this purpose the body is placed according to this invention in a chamber after the coating of the luminescent color; in this chamber a pressure is produced which is higher than atmosphere pressure and which might be higher even than 10 atmospheres; the body is heated at the same time up to the softening point or at least up to the softening of its surface.

By the high gas pressure the luminescent color will be pressed very rapidly and deep in the surface of the body and will stick by this very well to it. Besides this the advantage is produced that the luminescent color will be united in a gas pressure atmosphere already at very low temperatures with the surface of the body. This is especially important if one has to deal with luminescent colors which can be destroyed easily at high temperatures.

Experiments have shown that e. g. discharge tubes of long length which had been coated with the luminescent color according to this method, could be bent later on without difficulties and without loosening the luminescent color by this from the wall.

A glass suitable for taking up the fluorescent material is one with the following composition: $SiO_2$, 75.5%; $Na_2O$, 12.9%; CaO, 11.6%. This glass which has been widely used for vacuum tubes, and has a softening temperature of 600–700°, has been known for taking up fluorescent materials by softening, e. g., as described in the German Patent No. 447,043.

If one uses the method according to this invention for producing luminescent coating on electrical discharge tubes these tubes will be brought in a not closed state, into the chamber so that the high pressure will be charged to the outer as well as to the inner wall of the discharge tube. By this method it is prevented, that the tubing will not be changed in its size despite the application of very high pressures.

In several cases it will be of advantage, when the bodies coated with luminescent colors, and which had been brought into the chamber of pressure, are exposed to a low pressure after a sufficient charge of the pressure and time of heating; this low pressure is used for pumping away the vapours produced by the binder; after the low pressure charge the bodies are brought into a higher pressure and the heating of the bodies is repeated then.

As chamber for this treatment one can use an air tight closed device, which is provided with a pressure pipe connection and a heating apparatus. It is of advantage to provide an asbestos clothing in the chamber; in this clothing a heating wire winding is embedded for heating the chamber.

In order to avoid a suspension of very long bodies or at a very strong heating, it is advantageous to let the chamber rotate. It is also possible to rotate only the clips in which the bodies are fastened, which have to be coated with luminescent colors and which are brought into the chamber.

I claim:

1. A method of application of luminescent material to a body of vitreous material which comprises coating the surface of the body with a luminescent material prepared by mixing luminescent substance and a volatile binder, heating the body while unsealed in a pressure of the order of several atmospheres until softening occurs at least of the surface of the body to which the luminescent material is applied, lowering the pressure until any residual volatilized binder is removed, and again applying a pressure of the order of several atmospheres, while continuing the heating whereby to further coalesce the body and the applied material.

2. A method of application of luminescent material to a body of vitreous material which comprises coating the surface of the body with a luminescent material prepared by mixing luminescent substance and a binder, heating the body with both sides thereof exposed to a pressure of the order of several atmospheres, until softening of the body occurs at least at its surface to which the luminescent material is applied and maintaining the pressure and temperature until the body and the luminescent material become intimately associated.

3. A method of application of luminescent material to a body of vitreous material which comprises coating the surface of the body with a luminescent material prepared by mixing luminescent substance and a binder, heating the body with pressure of the order of several atmospheres applied to the surface on which the luminescent material is to be applied and a substantially equal supporting pressure on the other side, until softening of the body occurs, at least at its surface on which the luminescent material is applied, and maintaining the pressure and temperature until the body and the luminescent material become intimately associated.

4. A method of application of luminescent material to a body of vitreous material which comprises coating the surface of the body with a luminescent material prepared by mixing luminescent substance and a binder, heating the body with a pressure of the order of several atmospheres applied to its one surface, and an approximately equal supporting pressure applied to its opposite surface until softening of the body occurs at least at its surface on which the luminescent material is applied, rotating the body simultaneously so as to prevent its sagging, and maintaining the pressure and temperature until the body and the luminescent material become intimately associated.

EDMUND GERMER.